(12) United States Patent
Bouchard

(10) Patent No.: US 8,564,442 B2
(45) Date of Patent: Oct. 22, 2013

(54) RADIO FREQUENCY IDENTIFICATION (RFID) LABEL AND METHOD FOR MAKING THE LABEL

(75) Inventor: Olivier Bouchard, Romorantin (FR)

(73) Assignee: Paragon Identification, Argent sur Sauldre (FR)

( * ) Notice: Subject to any disclaimer, the term of this patent is extended or adjusted under 35 U.S.C. 154(b) by 527 days.

(21) Appl. No.: 12/753,315

(22) Filed: Apr. 2, 2010

(65) Prior Publication Data

US 2010/0253523 A1    Oct. 7, 2010

(30) Foreign Application Priority Data

Apr. 3, 2009  (FR) ..................................... 09 01619

(51) Int. Cl.
*G08B 13/14* (2006.01)
(52) U.S. Cl.
USPC ................. 340/572.8; 340/825.54; 340/825.3
(58) Field of Classification Search
USPC .......... 340/572.8, 572.1–572.7, 572.9, 825.3, 340/825.34, 825.54
See application file for complete search history.

(56) References Cited

U.S. PATENT DOCUMENTS

| | | | | |
|---|---|---|---|---|
| 5,528,222 | A * | 6/1996 | Moskowitz et al. ........ | 340/572.7 |
| 6,796,508 | B2 * | 9/2004 | Muller ........................ | 235/492 |
| 7,063,265 | B2 * | 6/2006 | Fujiki et al. ................. | 235/488 |
| 7,120,987 | B2 * | 10/2006 | Liu et al. ..................... | 29/600 |
| 7,135,973 | B2 * | 11/2006 | Kittel et al. ................. | 340/568.2 |
| 7,135,979 | B2 * | 11/2006 | Savagian et al. ........... | 340/572.8 |
| 7,259,106 | B2 * | 8/2007 | Jain ............................. | 438/737 |
| 2007/0059901 | A1 * | 3/2007 | Majumdar et al. .......... | 438/455 |
| 2007/0193095 | A1 * | 8/2007 | Eisenberg .................... | 40/700 |
| 2010/0090011 | A1 * | 4/2010 | Wee ............................. | 235/492 |

FOREIGN PATENT DOCUMENTS

| | | |
|---|---|---|
| EP | 1411465 | 4/2004 |
| EP | 1562140 | 8/2005 |
| EP | 1612723 | 1/2006 |
| EP | 1720121 | 11/2006 |
| WO | WO2006122266 | 11/2006 |

OTHER PUBLICATIONS

Search report from priority application No. FR 09/01619, filed Apr. 3, 2009.

* cited by examiner

*Primary Examiner* — Daniel Previl
(74) *Attorney, Agent, or Firm* — Lowe Hauptman & Ham, LLP

(57) ABSTRACT

The invention consists in an RFID label consisting of at least: one functional layer comprising at least one electronic component, one antenna connected to the electronic component; one upper layer; one lower layer having an adhesive surface; wherein the upper and lower layers consist of one or more materials capable of resisting to ultraviolet radiation and/or of filtering the ultraviolet radiation. The invention also includes the method for manufacturing the RFID label and the machine applying the method for manufacturing the RFID label.

17 Claims, 3 Drawing Sheets

RADIO FREQUENCY IDENTIFICATION (RFID) LABEL AND METHOD FOR MAKING THE LABEL

CROSS-REFERENCE TO RELATED APPLICATIONS

The present application claims priority of French Patent Application No. 09/01619, filed on Apr. 3, 2009, which is incorporated herein by reference in its entirety.

TECHNICAL FIELD

The present invention relates to the field of radiofrequency identification (RFID) and more particularly to RFID labels.

BACKGROUND

The present invention proposes an RFID label and its manufacturing method.

Identification by a radiofrequency is increasingly widespread in order to be used in many fields. This type of identification is generally based on a system consisting of a chip or an electronic component and of an antenna associated with a backing. This backing may have several shapes. For example, it may be in the form of an RFID card, also called a contactless chip card allowing for example identification of persons, thereby authorizing entry into a building or delivery of services to which the identified person has subscribed. It may also be in the form of a label adhesively bonded on a product used commercially for identifying this product or on the windscreen of a vehicle thereby authorizing access for example to a car park or motorway after identification.

RFID labels have to meet several requirements. One of them is resistance to light. Indeed, RFID labels used for vehicles, adhesively bonded behind a windscreen are subject to the action of ultraviolet rays (UV) from the sun which cause rapid degradation of the label and therefore deterioration of the chip and antenna system.

The object of the present invention is to provide a technical solution by proposing an RFID label, its manufacturing method and a machine, according to the method for manufacturing the RFID label.

In order to achieve this object, the RFID label consists of at least:
  one functional layer comprising at least:
    one electronic component;
    an antenna connected to the electronic component;
  one upper layer;
  one lower layer having an adhesive face;
    wherein the upper and lower layers consist of one or more materials capable of resisting to ultraviolet radiation and/or of filtering ultraviolet radiation.

According to another particularity, the upper layer is in paper.

According to another particularity, the upper layer is in a synthetic material having a printable coating.

According to another particularity, the lower layer is in paper capable of resisting to ultraviolet radiation and/or of filtering ultraviolet radiation and having a pressure sensitive face protected by a detachable layer.

According to another particularity, the lower layer is in a synthetic material capable of resisting to ultraviolet radiation and/or of filtering ultraviolet radiation and having a pressure sensitive face protected by a detachable layer.

According to another particularity, the lower layer has a printable surface.

According to another particularity, the pressure sensitive face consists of an adhesive, the physico-chemical properties of which do not deteriorate if it is subject to ultraviolet radiation.

According to another particularity, the detachable layer is in paper.

According to another particularity, the detachable layer is in synthetic material.

According to another particularity, the detachable layer is siliconized.

According to another particularity, the functional layer is in paper on which is etched or printed the antenna connected to the electronic component.

According to another particularity, the functional layer is in flexible synthetic material on which is etched or printed the antenna connected to the electronic component.

According to another particularity, the layers are assembled together by adhesive bonding.

According to another particularity, the upper layer (1) and/or the lower layer (2) and/or the functional layer (3) have a combination of inks capable of resisting to ultraviolet radiations and/or of filtering ultraviolet radiation.

According to another particularity, the upper layer (1) and/or the lower layer (2) and/or the functional layer (3) have one or more layers for printing a combination of inks capable of resisting to ultraviolet radiations and/or of filtering ultraviolet radiation.

Another object is achieved by proposing a method for making the RFID label wherein the upper layer and the lower layer are continuously fed by reels providing strips with a width at least equal to a multiple of one of the dimensions of the RFID label, in that the functional layer is continuously fed by at least one reel providing at least one strip in parallel and in that it includes at least the following steps:
  a step for continuous pre-printing and/or continuous pre-cutting the strip of the lower layer into a plurality of labels;
  a step for continuously pasting or depositing the plurality of labels of the strip of the lower layer onto the strip of a detachable layer;
  if need be, a step for continuously printing the strip of the upper layer;
  a step for continuously depositing the strip(s) of the functional layer onto the sized inner surface of the strip of the lower layer;
  a step for continuously depositing the sized strip of the upper layer onto the strip(s) of the functional layer;
  a continuous cutting step;
  an on-line continuous control step;
  an on-line continuous graphic and electric customization step.

According to another particularity, the inner surface of the strip of the lower layer and the strip of the upper layer are sized.

According to another particularity, the pre-printing step consists in a step for continuously printing the inner surface of the strip of the lower layer followed by a step for continuously printing the outer surface of the strip of the upper layer.

According to another particularity, the pre-printing step consists in a step for continuously printing the outer surface of the strip of the upper layer followed by a step for continuously printing the inner surface of the strip of the lower layer.

According to another particularity, the step for continuously pasting or depositing the plurality of labels of the strip of the lower layer onto the strip of a detachable layer is followed by a waste stripping step if the step for continuously pre-cutting the strip of the lower layer into a plurality of labels has been carried out.

According to another particularity, the step for continuously pasting or depositing the plurality of labels of the sized strip of the upper layer onto the strips of the functional layer is followed by a pressing step.

According to another particularity, the continuous cutting step consists in cutting out the assembled strips in strips of dimensions at least equal to the length or to the width of an RFID label and then winding up the cut-out strips as bobbins.

According to another particularity, the continuous cutting step consists in cutting out the assembled strips in strips with dimensions at least equal to the length or to the width of an RFID label and then folding the cut-out strips as fanfolds.

According to another particularity, the continuous cutting step consists in cutting out the assembled strips into individual RFID labels.

According to another particularity, the on-line control step is achieved by means of a reader antenna.

According to another particularity, the customization step is followed by a conditioning step.

Another object is achieved by proposing a machine for production according to the method for manufacturing the RFID label including an on-line succession of stations including at least:
- a reel feeding station for the lower layer,
- a reel feeding station for the upper layer,
- a station including at least one reel feeding module for the strip of the functional layer.
- at least one station for printing the upper layer.

According to another particularity, the machine further includes:
- a reel feeding station for the detachable layer,
- two automatic labeling heads for continuously depositing the lower adhesive surface of the strip of the lower layer onto the strip of the detachable layer.

According to another particularity, the machine further includes:
- a forming station for the cutting-out,
- a forming station for presenting the RFID labels as bobbins, fanfolds or individual RFID labels.

BRIEF DESCRIPTION OF THE DRAWINGS

Other particularities and advantages of the present invention will become more clearly apparent upon reading the description hereafter, made with reference to the appended drawings, wherein.

DETAILED DESCRIPTION OF THE INVENTION

Figure 1:
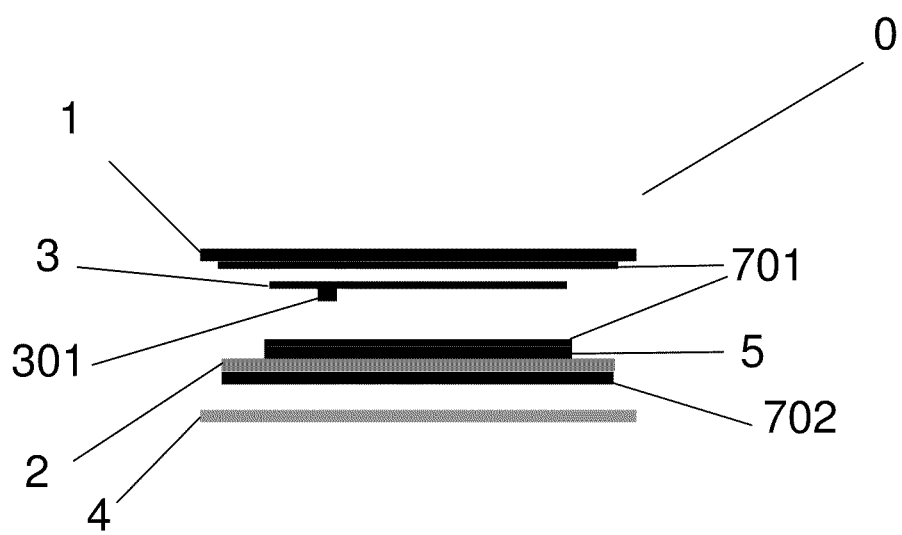
FIG. 1 illustrates a sectional view of the RFID label.

With reference to FIG. 1, the invention relates to an RFID label (0) consisting of at least:
- one functional layer (3) comprising at least:
  - one electronic component (301),
  - one antenna connected to the electronic component (301);
- one upper layer (1);
- one lower layer (2) having an adhesive layer;
  - wherein the upper and lower layers consist of one or more materials capable of resisting to ultraviolet radiation and/or of filtering the ultraviolet radiation and protecting the label against the latter.

The upper layer (1) for example is a polyester backing having a thickness from 15 µm to 200 µm.

The functional layer (3) is a backing, for example in PET (polyethylene terephthalate), on which is etched an antenna, for example in aluminium, connected to a high frequency or ultrahigh frequency electronic component (301), for example in silicon. Depending on the integrator and the type of protocol, the design of the antenna and the type of the electronic component (301) are variable.

The lower layer (2) for example is an acrylic or PET backing having a pressure sensitive face and a thickness varying from 15 µm to 200 µm for example.

The pressure sensitive face of the lower layer (2) is protected by a siliconized detachable layer (4), in paper or synthetic material having a thickness varying from 15 µm to 120 µm for example. The detachable layer (4) provides a protection against dirt and involuntary adhesion of the pressure sensitive surface of the RFID label. The face opposite to the pressure sensitive face of the lower layer (2) is printable.

The adhesive used for the pressure sensitive surface of the lower layer (2) is capable of resisting to ultraviolet radiation.

In a non-limiting way, the face opposite to the pressure sensitive face of the lower layer (2) is printable with inks, for example flexographic inks, providing protection against ultraviolet radiation to the RFID label.

The printing of the lower layer (2) by inks providing protection against ultraviolet radiation allows to create a supplementary protection layer of the label (0) against ultraviolet radiation. The supplementary protection layer (5) is created, for example, by a black flexographic layer, by a white screen printing layer and by a screen printing. The screen printing is first carried out, then the white screen printing layer and then the black flexographic layer. This further gives a protection for the electronic component and for the antenna against the ultraviolet radiation.

In a non-limiting way, protection of the label against ultraviolet radiation may be ensured by a combination of inks capable of resisting to ultraviolet radiation and/or of filtering the ultraviolet radiation. Several printing layers of a same ink are capable of resisting to ultraviolet radiation and/or of filtering the ultraviolet radiation.

The functional layer (3) is sandwiched between the upper layer (1) and the lower layer (2).

Figure 2:
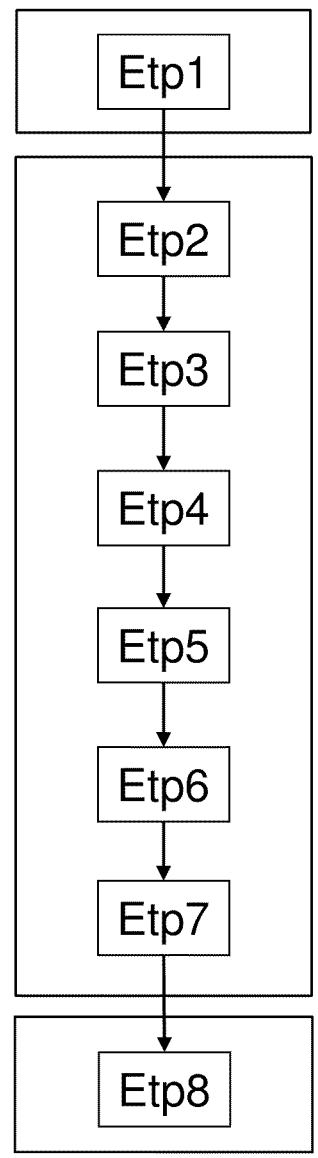
FIG. 2 illustrates the method for making the RFID label.
Figure 3:
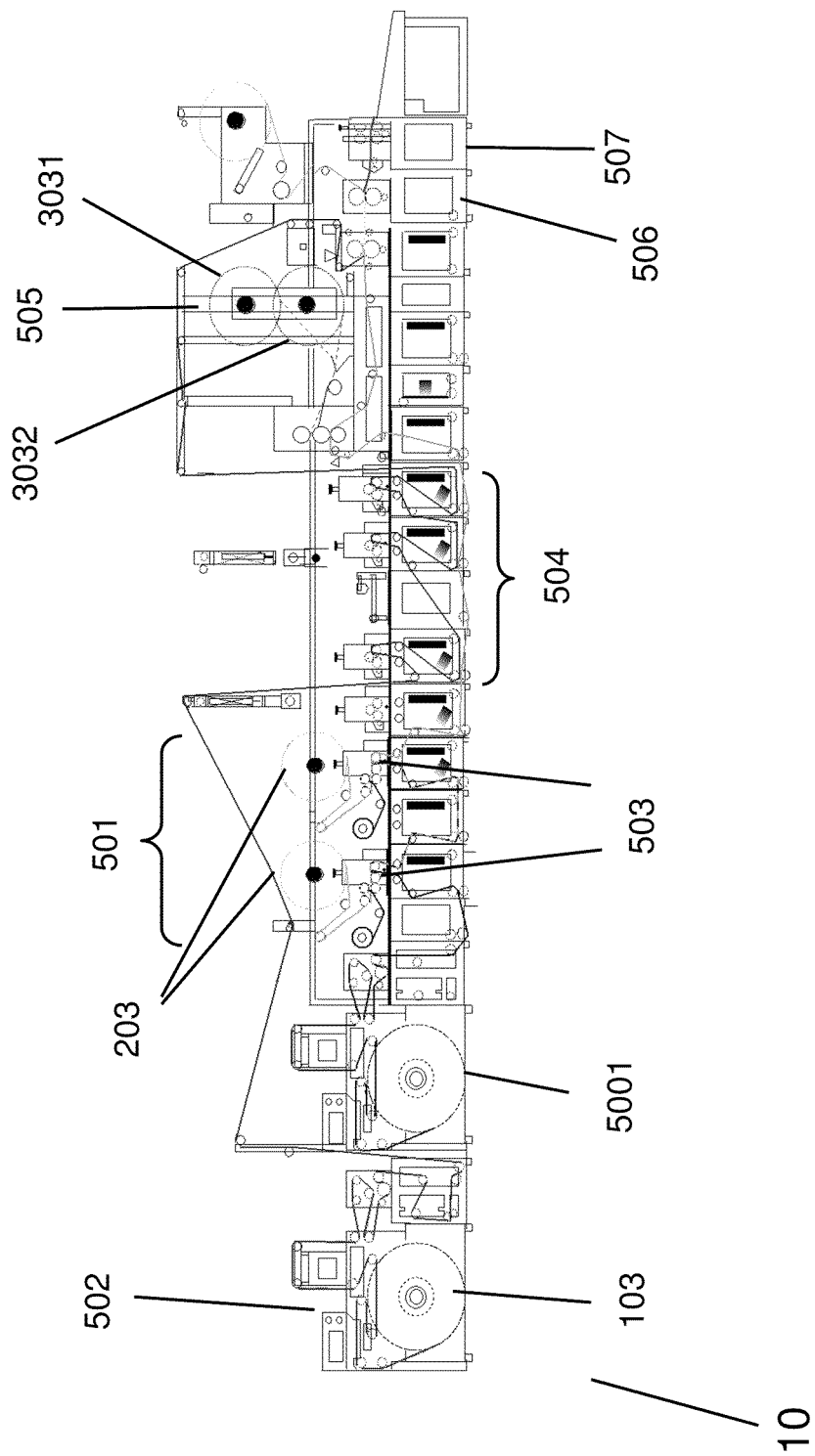
FIG. 3 illustrates the machine according to the method for manufacturing the RFID label.

With reference to FIGS. 2 and 3, the method for manufacturing the RFID label (0) includes several steps with which it is possible to achieve printing, complexing and forming of the RFID label (0) during a single pass on a press (10).

Before passing on the press (10), the lower layer (2) and the upper layer (1) are continuously fed by reels (103, 203) providing strips with a width at least equal to a multiple of one of the dimensions of the RFID label (0) allowing RFID labels (0) to be made continuously.

The functional layer (3) is continuously fed by at least one reel (3031, 3032) providing at least one strip in parallel thereby allowing continuous manufacturing of series of at least one RFID label (0).

According to a configuration, the width of the strips is at least equal to a multiple of the width of the RFID label (0).

According to another configuration, the width of the strips is at least equal to a multiple of the length of the RFID label (0).

In a first step (Etp1), the strip from the reel (203) forming the lower layer (2) is unwound in order to allow continuous pre-printing of the strip of the lower layer (2) for a plurality of labels. Pre-printing of the lower layer (2) is achieved on a press. Printing allows the RFID label (0) to be protected against ultraviolet radiation. The series of labels upon exiting the step (Etp1) may for example appear as bobbins of labels.

This step (Etp1) may be accompanied by a step for continuously pre-cutting the strip of the lower layer (2) into a plurality of labels to the dimensions of the RFID label (0).

According to a configuration, a following step (Etp2) consists of continuously pasting or depositing the plurality of labels of the lower layer (2), made in the preceding step, onto the detachable layer (4) by means of automatic labeling heads.

If a pre-cutting step has been carried out in the preceding step (Etp1), a waste stripping step is carried out in order to remove the unnecessary portions of the strip of the lower layer (2).

In a following step (Etp3), the strip of the reel (103) forming the material of the upper layer (1) is continuously unwound in order to allow continuous printing of the strips of the upper layers (1). Printing is carried out in line.

In a following step (Etp4), the reels (3031, 3032) making up the functional layer (3) are continuously unwound in order to be continuously deposited on the complex, consisting of the detachable layer (4) and of the lower layer (2). Adhesive is deposited on the complex. The adhesive used is, in a non-limiting way, a hot melt adhesive or a water-based or solvent-based adhesive or any other adhesive capable of effectively and durably maintaining together the layers of the RFID label (0). The strips forming the functional layer (3) are continuously cut out into individual functional layers. Each functional layer (3) is then continuously deposited on the sized area of the complex.

In a following step (Etp5), the reel (103) making up the upper layer (1) is continuously unwound in order to continuously deposit the strip of the upper layer (1) onto the functional layers (3) adhesively bonded onto the lower layer (2) in the preceding step (Etp4). Adhesive is deposited on the inner surface of the upper layer (1) before it will adhesively bond it onto the complex by pressing.

In a following step (Etp6), forming of the RFID labels is performed.

According to a configuration, the strips assembled in the preceding steps are continuously cut out longitudinally in order to obtain a plurality of strips with dimensions at least equal to the length or the width of an RFID label (0) and the number of strips of which is equal to the number of reels of functional layer (3). Each obtained strip is then wound up as bobbins.

According to another configuration, the strips assembled in the preceding steps are continuously cut out longitudinally in order to obtain a plurality of strips with dimensions at least equal to the length of an RFID label (0) and the number of strips of which is equal to the number of reels of functional layer (3). Each strip is subject to a series of perforation lines in order to condition the RFID label strips as fanfolds or for folding the strips and easily separating the RFID labels (0). The distance between each line of perforation is at least equal to the width of an RFID label (0).

According to another configuration, the strips assembled in the preceding steps are continuously cut out longitudinally in order to obtain a plurality of strips with a dimension at least equal to the width of an RFID label (0) and the number of strips of which is equal to the number of reels of functional layer (3). Each strip is subject to a series of lines of perforations for conditioning the strips of RFID labels in fanfolds or for folding the strips and easily separating the RFID labels (0). The distance between each line of perforations is at least equal to the length of the RFID label (0).

According to another configuration, the strips assembled in the preceding steps are continuously cut out into individual RFID labels (0).

In a following step (Etp7), proper operation of each electronic component system (301) connected to an antenna of each RFID label (0) is continuously controlled by means of a reader antenna.

In a following step, not shown, each electronic component associated with a label is subject to graphic and electric customization. Regardless of the presentation of the product in bobbins, in fanfolds or in individual labels, during customization according to the needs, reading of an identifier, coding of the electronic component and numbering then allowing its printing, are for example possible, as well as the creation of a log file or another file according to demand.

In a following step (Etp8), the bobbins, the fanfolds and the individual labels may be conditioned depending on the needs or on request from a client.

With reference to FIG. 3, the production machine (10) according to the method for making the RFID label (0) includes an in line succession of stations including at least:
  a reel (203) feeding station (501) for the lower layer (2),
  a reel (103) feeding station (502) for the upper layer (1),
  a station (505) including at least one reel feeding module (3031, 3032) of strips for the functional layer (3),
  at least one printing station (504) of the upper layer (1).

Preferentially, the production machine (10) further includes:
  a reel feeding station (5001) for the detachable layer (4),
  two automatic labeling heads (503) for continuously depositing the adhesive lower surface of the strip of the lower layer (2) onto the strip of the detachable layer (4).

Preferentially, the production machine (10) further includes:
  a forming station (506) for the cutting-out,
  a forming station (507) for presenting the RFID labels (0) as bobbins, fanfolds or individual RFID labels.

It should be obvious for the person skilled in the art that the present invention allows embodiments under many other specific forms without departing from the field of application of the invention as claimed. Therefore, the present embodiment should be considered as an illustration, but may be modified within the field defined by the scope of the appended claims, and the invention should not be limited to the details given above.

The invention claimed is:

1. A method of making the RFID label, the RFID label including at least:
  one functional layer comprising at least:
    one electronic component; and
    one antenna connected to the electronic component;
  one upper layer; and
  one lower layer having an adhesive surface;
  wherein the upper and lower layers consist of one or more materials capable of resisting ultraviolet radiation and/or of filtering ultraviolet radiation,
  wherein a supplementary protection layer against ultraviolet radiation is on the face opposite the adhesive surface of the lower layer, and
  wherein the upper layer and the lower layer are continuously fed by reels providing strips with a width at least equal to a multiple of one of the dimensions of the RFID label, the functional layer being continuously fed by at least one reel providing at least one strip in parallel, the method comprising at least the following steps:

a step of continuously pre-printing and/or continuously pre-cutting the strip of the lower layer into a plurality of labels;

a step of continuously pasting or depositing the plurality of labels of the strip of the lower layer onto the strip of a detachable layer;

a step of continuously depositing the strip(s) of the functional layer on a sized inner surface of the strip of the lower layer;

a step of continuously depositing a sized strip of the upper layer onto the strip(s) of the functional layer;

a continuous cutting-out step;

an on-line continuous control step; and a step of on-line continuous graphic and electric customization.

2. A manufacturing method according to claim 1, wherein the inner surface of the strip of the lower layer and the strip of the upper layer are sized.

3. The manufacturing method according to claim 1, wherein the preprinting step consists in a step for continuously printing the inner surface of the strip of the lower layer followed by a step for continuously printing the outer surface of the strip of the upper layer.

4. The manufacturing method according to claim 1, wherein the preprinting step consists in a step for continuously printing the outer surface of the strip of the upper layer followed by a step for continuously printing the inner surface of the strip of the lower layer.

5. The manufacturing method according to claim 1, wherein the step for continuously pasting or continuously depositing the strip of the lower layer onto the strip of a detachable layer is followed by a waste stripping step, if the step for continuously pre-cutting out the strip of the lower layer into a plurality of labels has been carried out.

6. The manufacturing method according to claim 1, wherein that the step for continuously pasting or depositing the plurality of labels of the sized strip of the upper layer onto strips of the functional layer is followed by a pressing step.

7. The manufacturing method according to claim 1, wherein the continuous cutting-out step consists in cutting out the assembled strips in strips with dimensions at least equal to the length or the width of an RFID label and then in winding up the cut-out strips as bobbins.

8. The manufacturing method according to claim 1, wherein the continuous cutting-out step consists in cutting out the assembled strips in strips with dimensions at least equal to the length or the width of an RFID label and then folding the cut out strips as fanfolds.

9. The manufacturing method according to claim 1, wherein the continuous cutting-out step consists in cutting out the assembled strips into individual RFID labels.

10. The manufacturing method according to claim 1, wherein the on-line control step is carried out with a reader antenna.

11. The manufacturing method according to claim 1, wherein the customization step is followed by a conditioning step.

12. The production machine according to claim 11 further including:

a reel feeding station for the detachable layer;

two automatic labelling heads for continuously depositing the adhesive lower surface of the strip of the lower layer onto the strip of the detachable layer.

13. The production machine according to claim 11, further including:

a forming station for the cutting-out;

a forming station for presentation of the RFID labels as bobbins, fanfolds or individual RFID labels.

14. The production machine according to claim 11, further comprising one printing station of the lower layer configured to print material protecting the RFID label against the ultraviolet radiation.

15. A machine for producing the RFID label applying the manufacturing method according to claim 1, including an in line succession of stations including at least:

one reel feeding station for the lower layer;

one reel feeding station for the upper layer;

one station including at least one reel feeding module of strips for the functional layer;

at least one printing station for the upper layer.

16. The manufacturing method according to claim 1, further comprising the step of continuously printing the strip of the upper layer.

17. The manufacturing method according to claim 1, wherein the step of continuously pre-printing comprises a step of continuously printing the inner surface of the strip of the lower layer for protecting the RFID label against the ultraviolet radiation.

* * * * *